United States Patent
D'Hondt et al.

(10) Patent No.: US 12,503,864 B2
(45) Date of Patent: Dec. 23, 2025

(54) FLOOR BOARD AND METHOD FOR MANUFACTURING SUCH FLOOR BOARDS

(71) Applicant: FLOORING INDUSTRIES LIMITED, SARL, Bertrange (LU)

(72) Inventors: Dieter D'Hondt, Sint-andries (BE); Aaron Shaw, High Point, NC (US)

(73) Assignee: UNILIN BV, Wielsbeke (BE)

(*) Notice: Subject to any disclaimer, the term of this patent is extended or adjusted under 35 U.S.C. 154(b) by 241 days.

(21) Appl. No.: 18/348,004

(22) Filed: Jul. 6, 2023

(65) Prior Publication Data

US 2023/0349168 A1 Nov. 2, 2023

Related U.S. Application Data

(63) Continuation of application No. 17/374,431, filed on Jul. 13, 2021, now Pat. No. 11,746,537, which is a continuation of application No. 16/808,745, filed on Mar. 4, 2020, now Pat. No. 11,473,315, which is a continuation of application No. 15/571,576, filed as application No. PCT/US2016/031170 on May 6, 2016, now Pat. No. 10,655,338.

(60) Provisional application No. 62/160,283, filed on May 12, 2015.

(51) Int. Cl.
*B32B 3/10* (2006.01)
*E04F 15/02* (2006.01)
*E04F 15/10* (2006.01)

(52) U.S. Cl.
CPC ...... *E04F 15/02038* (2013.01); *E04F 15/102* (2013.01); *E04F 15/107* (2013.01); *Y10T 428/24777* (2015.01)

(58) Field of Classification Search
None
See application file for complete search history.

(56) References Cited

U.S. PATENT DOCUMENTS

| | | |
|---|---|---|
| 4,337,093 A | 6/1982 | Metzner et al. |
| 5,593,483 A | 1/1997 | Brunken |
| 6,491,979 B1 | 12/2002 | Yamaguchi et al. |
| 6,620,459 B2 | 9/2003 | Colvin et al. |
| 7,584,583 B2 | 9/2009 | Bergelin et al. |
| 7,588,832 B2 | 9/2009 | Schiegl et al. |
| 9,757,974 B2 | 9/2017 | Kalwa |
| 9,957,420 B2 | 5/2018 | Morgeneyer et al. |
| 10,214,916 B2 | 2/2019 | Schulte |

(Continued)

FOREIGN PATENT DOCUMENTS

| | | |
|---|---|---|
| BE | 1011466 A6 | 10/1999 |
| CN | 101148573 A * | 3/2008 |

(Continued)

OTHER PUBLICATIONS

Machine translation of CN-101148573-A (Year: 2008).*

(Continued)

*Primary Examiner* — Christopher M Polley
(74) *Attorney, Agent, or Firm* — Workman Nydegger

(57) ABSTRACT

A floor board including a decorative surface layer applied to a substrate, where the substrate has MDF or HDF material at a side edge thereof, where the side edge is treated both with an impregnation agent and/or a sealing agent based on a super absorbing material. Also, a method for manufacturing such floor boards.

30 Claims, 2 Drawing Sheets

(56) References Cited

U.S. PATENT DOCUMENTS

| | | | |
|---|---|---|---|
| 11,976,472 | B2 | 5/2024 | D'Hondt et al. |
| 12,065,839 | B2 | 8/2024 | D'Hondt et al. |
| 2002/0023702 | A1 | 2/2002 | Kettler |
| 2003/0024199 | A1 | 2/2003 | Pervan |
| 2003/0125458 | A1 | 7/2003 | Thiele et al. |
| 2004/0161624 | A1* | 8/2004 | Hwang ............ B27N 3/00 |
| | | | 428/541 |
| 2006/0048675 | A1 | 3/2006 | Krusemann et al. |
| 2006/0191226 | A1 | 8/2006 | Kim et al. |
| 2007/0160816 | A1 | 7/2007 | Linnemann |
| 2007/0209736 | A1* | 9/2007 | Deringor ............ B27B 31/06 |
| | | | 83/365 |
| 2008/0256890 | A1 | 10/2008 | Pervan et al. |
| 2009/0260313 | A1* | 10/2009 | Segaert ............ B44C 5/043 |
| | | | 52/592.1 |
| 2010/0058694 | A1 | 3/2010 | Eiden |
| 2010/0175343 | A1 | 7/2010 | Kruesemann et al. |
| 2010/0293879 | A1 | 11/2010 | Pervan et al. |
| 2010/0311854 | A1 | 12/2010 | Thiers |
| 2011/0014425 | A1 | 1/2011 | Wirz |
| 2011/0189471 | A1 | 8/2011 | Ziegler et al. |
| 2011/0281066 | A1 | 11/2011 | Andrews et al. |
| 2011/0319558 | A1 | 12/2011 | Rehnberg et al. |
| 2012/0276348 | A1 | 11/2012 | Clausi et al. |
| 2013/0104478 | A1 | 5/2013 | Meersseman |
| 2013/0122208 | A1 | 5/2013 | Bilotto et al. |
| 2015/0017461 | A1 | 1/2015 | Lindgren et al. |
| 2015/0068838 | A1 | 3/2015 | Keene |
| 2018/0119429 | A1 | 5/2018 | Schulte |

FOREIGN PATENT DOCUMENTS

| | | | |
|---|---|---|---|
| CN | 202039544 U | 11/2011 | |
| DE | 9202976 U1 | 5/1992 | |
| DE | 29610462 U1 | 8/1996 | |
| DE | 20002744 U1 | 8/2000 | |
| DE | 19963203 A1 | 9/2001 | |
| DE | 10250695 A1 | 5/2004 | |
| DE | 102005058971 A1 | 6/2007 | |
| DE | 102007024261 A1 | 11/2008 | |
| DE | 102008034749 B3 | 1/2010 | |
| DE | 102007002395 B4 | 5/2012 | |
| DE | 102008011798 B4 | 7/2012 | |
| DE | 102013102351 A1 | 9/2014 | |
| DE | 202015101572 U1 | 4/2015 | |
| EP | 0022900 A1 | 1/1981 | |
| EP | 0798349 A2 | 10/1997 | |
| EP | 0903451 A2 | 3/1999 | |
| EP | 0930351 A1 | 7/1999 | |
| EP | 0974713 A1 | 1/2000 | |
| EP | 0988420 A1 | 3/2000 | |
| EP | 1127935 A1 | 8/2001 | |
| EP | 1167654 A2 | 1/2002 | |
| EP | 1210392 A1 | 6/2002 | |
| EP | 1898024 A1 | 3/2008 | |
| EP | 2013034 A2 | 1/2009 | |
| EP | 1691005 B1 | 8/2009 | |
| EP | 2147762 A1 | 1/2010 | |
| EP | 1549486 B1 | 5/2010 | |
| EP | 2623282 A1 | 8/2013 | |
| EP | 2828101 A1 | 1/2015 | |
| EP | 2918747 A1 | 9/2015 | |
| EP | 3294969 B1 | 6/2019 | |
| FR | 2890593 A1 | 3/2007 | |
| JP | 05-302270 A | 11/1993 | |
| JP | 3398438 B2 | 4/2003 | |
| JP | 2004-358947 A | 12/2004 | |
| JP | 2009-269289 A | 11/2009 | |
| KR | 10-0639933 B1 | 11/2006 | |
| WO | 9747834 A1 | 12/1997 | |
| WO | 0175247 A1 | 10/2001 | |
| WO | 0196688 A1 | 12/2001 | |
| WO | 02/22332 A1 | 3/2002 | |
| WO | 02/24421 A1 | 3/2002 | |
| WO | 02/60691 A1 | 8/2002 | |
| WO | 02059435 A1 | 8/2002 | |
| WO | 03012224 A1 | 2/2003 | |
| WO | 03016654 A1 | 2/2003 | |
| WO | 2004/016422 A1 | 2/2004 | |
| WO | 2004/035276 A2 | 4/2004 | |
| WO | 2004/076141 A2 | 9/2004 | |
| WO | 2006038867 A1 | 4/2006 | |
| WO | 2006043893 A1 | 4/2006 | |
| WO | 2006066776 A2 | 6/2006 | |
| WO | 2006/088417 A2 | 8/2006 | |
| WO | 2007/067648 A2 | 6/2007 | |
| WO | 2007113676 A2 | 10/2007 | |
| WO | 2007/123298 A1 | 11/2007 | |
| WO | 2008/017689 A1 | 2/2008 | |
| WO | 2008078181 A1 | 7/2008 | |
| WO | 2009050565 A1 | 4/2009 | |
| WO | 2009066153 A2 | 5/2009 | |
| WO | 2010/055429 A2 | 5/2010 | |
| WO | 2010/088769 A1 | 8/2010 | |
| WO | 2010087752 A1 | 8/2010 | |
| WO | 2010122514 A2 | 10/2010 | |
| WO | 2011141851 A2 | 11/2011 | |
| WO | 2012004700 A2 | 1/2012 | |
| WO | 2012/049577 A2 | 4/2012 | |
| WO | 2012/115898 A1 | 8/2012 | |
| WO | 2013/068298 A1 | 5/2013 | |
| WO | 2013102803 A2 | 7/2013 | |
| WO | 2013118030 A2 | 8/2013 | |
| WO | WO-2013139681 A1 * | 9/2013 | ............ B27N 7/005 |
| WO | 2014/090939 A1 | 6/2014 | |
| WO | 2014/206802 A1 | 12/2014 | |
| WO | 2016182896 A1 | 11/2016 | |

OTHER PUBLICATIONS

Machine Translation Aug. 22, 2018 of DE 10250695.
Machine translation of DE-10250695-A 1 (Year: 2004).
Machine translation of ep 0798349 (Year: 1997).
Machine translation of KR-639933-B1 (Year: 2006).
Communication of a notice of opposition in corresponding European application EP 16725662.7 dated Dec. 13, 2019.
Krug, Detlef, "Influence of Fiber Pulsing Conditions and of the Binding Agent on the Properties of Medium-Density Fiberboard (MDF) for use in Damp and Outdoor Areas," Dissertation University of Hamburg, May 28, 2010.
Laminate Flooring, https://de.wikipedia.org/wiki/Laminatboden, Feb. 14, 2020, pp. 1-4.
Medium-density fibreboard, https://de.wikipedia.org/wiki/Mitteldichte_Holzfaserplatte, Feb. 14, 2020, pp. 1-9.
International Search Report (ISR) dated Jul. 29, 2016, for PCT/US2016/031170.
Written Opinion dated Jul. 29, 2016, for PCT/US2016/031170.
Extended European Search Report in corresponding European Application No. 18207359.3-1002, dated Feb. 22, 2019.
"Fibreboard Requirements", European Committee for Standardization, Oct. 3, 2009, 21 pages, Brussels, Belgium, 89 pages.
"Laminate flooring-elements with a top layer based on amnioplastic, heat-hardenable specifications and requirements", European Committee for Standardization, Aug. 1, 2016, 100 pages, Brussels, Belgium.
"Laminate flooring-direct printed elements with synthetic resin top layer, specifications, requirements and methods", European Committee for Standardization, Nov. 1, 2015, 51 pages, Brussels, Belgium.
"Particleboard and fibreboard: determination of thickness swelling after water storage", Aug. 1, 1993, 2 pages.
"1-Methoxy-2-propylacetat," "The Wayback Machine", Wikipedia, accessed from https://web.archive.org/web/20140929202253; http://de.wikipedia.org/wiki/L-Methoxy-2-propylacetat on Nov. 7, 2022, 5 pages.
"Wood fibreboards-definition, classification and symbols", European Committee for Standardization, Jul. 1, 2009, 21 pages.
Youngquist, John A., "Wood-based composites and panel products", Wood handbook—Wood as an engineering material. Forest Products Laboratory, as early as Jan. 1, 1999, 32 pages.

(56) References Cited

OTHER PUBLICATIONS

Dunky et al., "Holzwerkstoff und Leime: Technologie und Einflussfaktoren," Springer, Aug. 8, 2002, 14 pages.
Dix et al., "Paraffine unterschiedlicher Kettenlange als Hydrophobierungsmittel in mitteldichten Faserplatten (MDF)," Holz als Roh und Werkstoff, vol. 61, Oct. 9, 2003, 5 pages.
Scheile, "Improvement of Edges at Laminate Floorings" European Laminates Conference and Workshop, Berlin, Germany, Apr. 19-22, 2004, 19 pages.
Roffael et al., "Zur Hydrophobierung von mitteldichten Faserplatten (MDF) mit Paraffinen Teil 1: Einfluss der chemischen Zusammensetzung des Paraffins und des Emulgatortyps auf die Hydrophobierung von MDF," Holz als Roh und Werkstoff, vol. 63, Apr. 1, 2005, 24 pages.
"Indoor Laminate flooring Guide," Parador, as early as Jan. 1, 2011. 26 pages.
Thoemen et al., "Wood-Based Panels: an Introduction for Specialists", Brunel University Press, at least as early as Dec. 31, 2010, 152 pages.

* cited by examiner

FLOOR BOARD AND METHOD FOR MANUFACTURING SUCH FLOOR BOARDS

CROSS REFERENCE

This application is a continuation of U.S. application Ser. No. 17/374,431 filed Jul. 13, 2021, which is a continuation of U.S. application Ser. No. 16/808,745, filed Mar. 4, 2020, now U.S. Pat. No. 11,473,315, which is a continuation of U.S. application Ser. No. 15/571,576, filed Nov. 3, 2017, now U.S. Pat. No. 10,655,338, which is the national stage filing of International application PCT/US2016/031170, filed May 6, 2016, which are incorporated herein by reference. This application also claims the benefit under 35 U.S.C. 119(e) to U.S. provisional application No. 62/160,283 filed on May 12, 2015.

This invention relates to floor boards or floor panels, and to a method for manufacturing such floor boards.

More particularly, the invention relates to floor boards of the type which comprises a single- or multi-part substrate consisting at least partially of wood-based material, in particular of MDF or HDF (Medium Density Fiberboard or High Density Fiberboard), and which floor panels have a decorative surface layers as a top layer, such as prefabricated parquet or veneer parquet with a top layer usually being made on the basis of wood, or such as laminate floor panels usually having a top layer on the basis of synthetic material.

BACKGROUND OF THE INVENTION

It is known that such floor boards can be applied for forming a floating floor covering. Herein, these floor boards during installation are coupled at their side edges, either by means of a classical tongue and groove connection, wherein these latter possibly are glued into each other, or by means of mechanical coupling parts providing for a mutual locking of the floor panels, for example, in horizontal as well as in vertical direction, as described for example, in the International Patent Applications WO 97/47834, WO 01/75247, WO 02/059435, WO 03/016654, WO 2006/043893 and WO 2009/066153, all incorporated herein by reference.

Floor boards of the abovementioned type show the disadvantage that they easily take up moisture, which as such may lead to a variety of undesired effects, such as upstanding edges or premature wear.

WO 2008/078181 discloses an edge treatment for floor boards, wherein an active agent with moisture-repellent effect is coated onto the mechanical coupling means. The active agent comprises a fluorinated polymer, or copolymer and may be dispersed in water. As an alternative the WO '181 also discloses edge treatments with a hardened monomer-free UV lacquer or a solidified hot-melt glue. Such coating may interfere with the coupling means and lead to difficulties in installation and/or to malfunctioning joints, e.g., gaps.

BE 1011466, DE 200 02 744 U1, WO 03/012224, WO 2010/122514 and EP 2 147 762 disclose an impregnation of MDF/HDF material for the core of a floor board, e.g., with polyurethane or MDI (methylene diphenyl di-isocyanate), such that an enhanced side edge area originates where the mechanical coupling parts are formed. It is sometimes hard to penetrate the MDF/HDF material sufficiently deep to obtain a lasting minimization of the effects of moisture on the floor boards.

DE 10 2005 058 971 and U.S. Pat. No. 7,584,583 disclose the use of swelling materials, such as hydrogels, for sealing the joint upon moisture ingress. Such swelling material may only become effective after the first damage to the floor boards has been done.

SUMMARY OF THE INVENTION

The present invention aims at minimizing the effects of moisture on floor boards comprising a decorative surface layer and a substrate of MDF or HDF. Preferably, the effects are further minimized when compared to the state of the art. Therefore, in accordance with its first independent aspect, the present invention relates to a floor board comprising a decorative surface layer applied to a substrate, wherein said substrate comprises MDF or HDF material at a side edge thereof, with as a characteristic that said side edge is treated with an impregnation agent and/or a sealing agent based on a super absorbing material, preferably said side edge is treated with both an impregnation agent and/or a sealing agent based on a super absorbing material. The combination of an impregnation agent and a super absorbing material leads to an effective minimization of detrimental effects due to moisture. The impregnation agent preferably provides for an additional binding the wood fibers in the MDF/HDF material, such that any swelling is less prominent, while the presence of the super absorbing material may shield the joint from moisture ingress leading to such swelling. The impregnation agent has only minimal effect, if any, on the functionality of possible mechanical coupling parts.

The term "superabsorbent materials" refers to water-swellable, water-insoluble organic or inorganic materials including superabsorbent polymers and superabsorbent polymer compositions capable, under the most favorable conditions, of absorbing at least about 10 times their weight, or at least about 15 times their weight, or at least about 25 times their weight in an aqueous solution containing 0.9 weight percent sodium chloride.

Preferably said impregnation agent comprises at least an MDI (methylene diphenyl di-isocyanate). As an alternative, or in combination with MDI, said impregnation agent may comprise one or more substances chosen from the list consisting of an epoxy resin, a fluorocopolymer and acetic anhydride. In the case of acetic anhydride an acetylation of the wood fibers is obtained rather than an enhanced binding. Acetylation leads to wood fibers becoming less susceptive to moisture. The OH-groups in wood are replaced by acetyl groups, leading to a lesser reaction of $H_2O$ (water) groups from the moisture to the wood fiber.

According to a special embodiment said impregnation agent comprises a mixture of MDI and a fluorocopolymer. Preferably per 100 parts of MDI, less than 20 parts of fluorocopolymer are applied in said mixture, or even less than 10 or less than 5 parts. Fluorocopolymer tends to fill areas of the MDF/HDF that are untreated by the MDI. According to a variant of this special embodiment firstly an impregnation agent is applied mainly comprising MDI and possibly solvent as explained below, and subsequently an impregnation agent is applied mainly comprising fluorocopolymer and possibly solvent, wherein preferably the fluorocopolymer is available in a dose lower than 20 parts per 100 parts of solvents. According to this variant the subsequent treatment is able to better fill the areas untreated by the MDI, since it will be attracted in a more efficient way to such areas after the MDI has already been impregnated into the MDF/HDF material at least to some extent.

Preferably said impregnation agent comprises a solvent, different from water, preferably a butylacetate or propylacetate, such as 3-Methoxy-3-Methyl-1-Butylacetate (MMB- AC) or 1-Methoxy-Propylacetate (MPA), a dibasic ester, a glycol diether, such as Dipropylene Glycol Dimethyl Ether, a benzoate ester, such as that sold under the name Prifer 6813, a diphenylmethane or diphenylethane, such as Butyl Diphenyl Methane and/or Butyl Diphenyl Ethane, e.g. the mixture of both sold as Vycel U, or, a tetramethoxyether, such as Ethane,1,1,2,2-tetramethoxy-. Other possible solvents include those registered in Europe, USA, Australia, South Korea and Japan under Rhodiasolv® IRIS. It has been found that the use of a non-water solvent leads to deeper penetration of the impregnation agent into the side edge of the floor boards substrate. The above listed solvents also possess a high flash point, there by making it safe to be used in an industrial environment. When the flash point is considered less important, the inventor has obtained good results with acetone or ethylacetate as well.

Preferably a solvent is selected having a flash point above 30° C., and even better of 60° C. or above.

Preferably the solvent is mixed at a rate between 10 and 40%, preferably between 15 and 30%, into the impregnation agent.

Preferably the solvent is hydrophobic, at least to some extent, such as is the case with propylacetate, diphenylmethane and diphenylethane. In a preferred example, a solvent is used that is based on a mixture of diphenylmethane and diphenylethane, e.g., butyl diphenylmethane and butyl diphenylethane. This mixture has no effect or a negligible effect on the reactivity of e.g., MDI. The inventors have found that the use of hydrophobic solvents leads to an enhanced initial water resistance, i.e., the first hours. It is assumed that the solvent repels the moisture during the initial contact.

According to a special embodiment, said impregnation agent may comprise an oil-type solvent, such as turpentine, linseed oil, either boiled or unboiled, castor oil, soy oil, or other protein-based liquids. These types of solvents have been shown to be of particular usefulness when the impregnation agent is an MDI, or other polyisocyanate based chemical. These solvents are hydrophobic and have a particularly high flash point.

Preferably an impregnation depth is reached of at least 1 or at least 2 millimeters. Even more preferably the impregnation depth is at least 4 or 5 millimeters beneath the profile of the respective side edge. Preferably the impregnation depth is not deeper than 10 millimeters. With hydrophobic solvents the impregnation depth may be less deep to attain similar effects as with less hydrophobic or hydrophilic solvents, e.g., between 0.8 and 3 or 4 millimeters. A penetration of 0.8 to 1 mm or more is desirable in the cases where beveled edges are applied to the respective upper edge. In such cases the impregnation agent preferably penetrates upward from a position below the beveled edge, such that also the MDF material under the beveled surface becomes treated.

As compared to the thickness of the substrate, the impregnation depth is preferably between 10 and 100%, or between 20 and 75%.

An impregnation going deeper than the thickness of the substrate material should be avoided, since the impregnation agent may become spread too much to be effective. On the other hand, the impregnation agent should possess a viscosity low enough to be able to penetrate well into the interstices of the substrate. For enhancing the ease of penetration the use of a solvent is preferred, while for limiting the penetration depth the availability of at least some wax in the substrate material is preferred. Too high a wax content may block any penetration of the impregnation agent. A preferred range of the wax content in the substrate material is between 0.1 and 3% of the total weight of the MDF/HDF material.

The thickness of the substrate is preferably between 5 and 12 millimeters, and even better between 6.5 and 9.5 millimeter.

Preferably said super absorbing material comprises crystals of sodium polyacrylate (SPA). Such crystals may be very small, e.g., with a mean particle diameter of less than 100 micron in not-swollen condition, such that that they hardly interfere with the joint geometry, such as a joint geometry with mechanical coupling parts. Very good results have been reached with this super absorbing material, and, in accordance with a second independent aspect of the present invention, it also relates to a floor board comprising a decorative surface layer applied to a substrate, wherein said substrate comprises MDF or HDF material at a side edge thereof, wherein said side edge is treated with a sealing agent based on a super absorbing material, said super absorbing material comprises crystals of polyacrylate, preferably having a mean particle size of less than 150 micron, and even better of 100 micrometer or less. Preferably the mean particle size is 5 micron or more such that they are prevented from entering the interstices between the fibers of the MDF/HDF material.

According to another example said particles of absorbing material may relate to particles of bentonite clay, amorphous silica or fuller earth, such as palygorskite and/or attapulgite.

It is clear that the floor board of the second independent aspect preferably also shows the features of the above mentioned first independent aspect, and/or its preferred embodiments.

Preferably the super absorbing materials may be applied in a step separate from the step of applying the impregnation agent. Especially in the case the impregnation agent is an MDI, this may prove beneficial, since the super absorbing material, particularly SPA, tends to increase the viscosity of the MDI-SPA mixture, thereby leading to a less deep penetration of the impregnation agent. Preferably the super absorbing materials, e.g., the above-mentioned SPA crystals, are applied in a liquid dispersion, or by means of powder coating or sprinkling operations.

The invention of the first and/or the second independent aspect are preferably applied to floor boards which at the respective side edge as well as on a side edge opposite thereto comprises mechanical coupling means allowing to couple said floor board at the respective edges with a similar floor board such that said floor board and said similar floor board become locked both in a direction perpendicular to said decorative surface layer, as well as in a direction perpendicular to said edge and in a plane formed by said decorative surface layer. It is especially with respect to such floor boards, particularly those that are used to form a floating floor covering by locking a plurality of such floor boards by means of mechanical coupling means, that problems with moisture are prominent. Preferably said coupling means are at least partly formed by profiled contours of said MDF/HDF material at the mentioned opposite side edges. In some cases, these coupling means may basically be shaped as a tongue-in-groove coupling provided with additional locking means for creating said locking in the direction perpendicular to said edge and in the plane of the panels.

In the case the mechanical coupling means allow for creating a coupled condition with a tension force pushing the coupled floor boards towards each other, in accordance with WO 97/47834, e.g., by means of a bent-out lower groove lip that pushes on the tongue, an extra barrier is created against moisture ingress into the joint. Such tension force may obviate the need for the application of a sealing agent. According to a special independent aspect the invention therefore also relates to a floor board treated with an impregnation agent, such as those listed in the other aspects of the present invention, at opposite edges, wherein these edges are provided with coupling parts allowing for creating a coupled condition in which a tension force is active.

Preferably said sealing agent seals the joint between the adjacent edges of said floor board and said similar floor board, e.g., upon first moisture ingress.

The treatments of the invention, i.e., the impregnation agent and/or the super absorbing material may be applied to one or both of said opposite edges. The impregnation agent is preferably applied to both opposite edges. The super absorbing material may be applied to only one of said opposite edges.

Preferably the decorative surface layer, is a surface layer having a thickness less than 0.75 millimeter, or less than 0.5 millimeter. It is especially with such thin surface layer that any swelling of the substrate material quickly is discernible from the top layer, such that the invention has the largest benefits here. Preferably said sealing agent creates a sealing between the adjacent edges of said floor board and said similar floor board at the height of the lateral edge of said surface layer, or immediately underneath it, namely less than 1 millimeter under said surface layer.

Particularly important examples of such thin surface layers where the invention may have great effects are surface layers formed from at least one or more paper layers, or surface layers formed from at least one or more wood veneer layers. In the case of a surface layer formed from one or more paper layers, preferably a so-called DPL (direct pressure laminate) panel is concerned, wherein these paper layers are impregnated with a thermohardening resin, such as with a melamine based resin. Surface layers formed of paper layers and/or veneer layers are particularly prone to deterioration by moisture.

The impregnation agent and the sealing agent are preferably applied as a mixture in a suspension or emulsion with a non-water solvent. Especially in the cases where the sealing agent is primarily constituted by crystals while the impregnation agent is a liquid substance, this leads to advantageous results. The aforesaid mixture is in fact filtered at the boundary surface of the MDF/HDF material, with the crystals being relatively uniformly distributed over the side edge, or at least over that part of the side edge that is treated by means of the suspension or emulsion.

According to a variant said impregnation agent and sealing agent are at least partially separately applied. They may be applied partially on top of each other, wherein preferably the impregnation agent is the lowermost, such that it is not hindered to penetrate the MDF/HDF material. According to an alternative they may be applied adjacent to each other, with or without an intermediate distance along the profiled edge, as seen in cross-section.

The sealing agent, especially in the case where such sealing agent is crystal- or powder shaped, may be adhered to the surface of said side edge by means of a hydrophobic acrylate and/or a photo curing acrylate, such as UV curing acrylate. This may be obtained by applying the sealing agent together with such acrylate, e.g., crystals in a suspension of a photo curing, e.g., UV curing acrylate, and curing the acrylate when applied to the side edge of the floor board.

Preferably said impregnation agent at least penetrates the MDF/HDF material immediately below said decorative surface layer at said side edge. Still more preferably said impregnation agent at least penetrates the MDF/HDF material in the entire top half of the thickness at said side edge, or even in the entire thickness, or almost the entire thickness, such as at least 85 percent of the thickness.

As for the MDF/HDF material preferably a MDF/HDF material board is used comprising wood fibers glued by means of ureumformaldehydeglue, melamineureumformaldehyde and/or MDI. Preferably the MDF/HDF material comprises some wax, preferably between 0.1 and 3% by weight of said substrate. Preferably the MDF/HDF material has an average density of more than 750 kg per cubic meter, and may comprise higher density regions near to one or both flat surfaces, preferably at least near the decorative surface layer. Preferably such higher density regions have a density of 900 kilograms per cubic meter or more. The inventors have found that such higher density region near the decorative surface layer is particularly interesting, since on the one hand it is in itself more water tight than the lower density material of the substrate, and, on the other hand, it forms a barrier against the penetration impregnation agent, in particular the MDI comprising solvent or not. The barrier prevents the impregnation agent of interfering with the decorative surface layer whilst it secures a good water resistance by itself close to the decorative surface layer.

The floor panel treatments of the first and/or second aspect may be combined with a coating agent that forms a water tight layer on the respective edge, or part of it. Such coating agent may for example relate to nano or micro clay, to micro-wax or TEFLON powder. Such particles may fill the remaining untreated interstices in the MDF/HDF material. According to a special independent aspect of the invention, it relates to a floor board comprising a decorative surface layer applied to a substrate, wherein said substrate comprises MDF or HDF material at a side edge thereof, wherein said side edge is coated with a coating agent, preferably chosen from the list consisting of nanoclay, microclay, microwax and TEFLON powder. It may for example relate to particles of bentonite clay or amorphous silica. Preferably, the particles of such coating agent have an average particle diameter of less than 100 micron, and preferably less than 30 micron.

With the same goal as in the first and second aspect, according to a third independent aspect, the present invention relates to a method for manufacturing a floor board, said floor board comprising a decorative surface layer applied to a substrate, said method comprising:

providing a substrate material comprising MDF/HDF material;

applying a decorative surface layer to a top surface of said substrate material;

dividing said substrate material into planks having approximately the size of said floor board;

profiling an edge of said planks; said MDF/HDF material being exposed at said edge;

impregnating said edge with an impregnation agent;

with as a characteristic that one or more of the following measures are applied:

said impregnation agent comprises a solvent, preferably a hydrophobic solvent;

said method comprises a step of wetting said edge subsequent to said profiling and prior to said impregnating;

said MDF/HDF material comprises wax at a rate of 0.1 to 3%;

said MDF/HDF material comprises zones of locally lowered density at said edge.

It is clear that, in this third aspect, preferably an MDI based impregnation agent is used, for example the impregnation agents mentioned in connection to the first and second aspect.

It is further clear that each of the abovementioned measures may be applied separately or in combination with one or more of the other measures. Each of these measure leads to a better penetration of the impregnation agent into the MDF/HDF material.

According to the first measure, the impregnation agent comprises a solvent, preferably a non-water solvent, preferably a butylacetate or propylacetate, such as 3-Methoxy-3-Methyl-1-Butylacetate (MMB-AC) or 1-Methoxy-Propylacetate (MPA), a dibasic ester, a glycol diether, such as Dipropylene Glycol Dimethyl Ether, a benzoate ester, such as that sold under the name Prifer 6813, a diphenylmethane or diphenylethane, such as Butyl Diphenyl Methane and/or Butyl Diphenyl Ethane, e.g. the mixture of both sold as Vycel U, or, a tetramethoxyether, such as Ethane,1,1,2,2-tetramethoxy- or acetone. The use of a solvent allows to lower the viscosity of the liquid such that it can more easily enter the interstices between the fibers of the MDF/HDF material. The use of a non-water solvent, such as acetone, may lead to a degradation of the lignin in the wood fibers. This degradation favors penetration of the impregnation agent, and the efficiency of the impregnation agent as it may influence the stability of the attacked wood fiber to a larger extent. According to an alternative a hydrophobic solvent is used. With such solvent the penetration depth may be less deep, since the inventor has found that the initial repellency of moisture obtained with such solvent is very effective.

According to the second measure, said method comprises a step of wetting said edge subsequent to said profiling and prior to said impregnating. The wetting may be performed with any substance, water or non-water. Preferably a non-water substance is used, such as one of the solvents named above. This wetting may lead to a better impregnation of the subsequently applied impregnation agent, e.g., because the wetting agent degraded the lignin in the wood fibers, and/or to a higher efficiency of the impregnation agent.

Preferably the wetting is performed using a non-water solvent, such as acetone, whilst the impregnation agent may comprise a solvent which is hydrophobic, such as propylacetate or diphenylmethane.

According to the third measure, said MDF/HDF material comprises wax at a rate between 0.1 and 3% by weight of the MDF/HDF material. The inventor has noted that some wax is needed to prevent the impregnation agent from penetrating needlessly deep into the MDF/HDF material. The wax to some extent puts a burden to the penetrating liquid and is in itself water repelling. Nevertheless, the inventor, surprisingly, has found that a too high amount of wax is also detrimental to the moisture resistance obtained with the impregnation agent.

According to the fourth measure, said MDF/HDF material comprises zones of locally lowered density at said edge. Such zones preferably have an average density which is at least 10 percent lower than the remaining material of the board. Such MDF/HDF boards are for example disclosed in WO 2009/050565. The zones are preferably generally directed along said side edge of the floor board and may show a width equaling at least 1 to 5 times the thickness of the board.

With respect to the step of impregnation the edge with an impregnation agent, it is clear that it implies the application of an impregnation agent on the respective side edge. Any application method may be used, such as spraying, vacuum coating, vertical bathing methods, immersion methods, wheel coating, brush application, profiled heads under pressure and similar. Preferably the application is done with the planks moving with their to be treated edges past the application device. Examples of possible application methods are described in DE 92 029 76 U1, WO 2008/078181, WO 2012/004700, BE 1011466 and WO 2006/038867. Preferably the application takes place with the floor board being transported on the transporting device, e.g., the chain transporting device, incorporated in the milling machine that profiles the respective edge. According to another possibility the application takes place immediately after the board has exited the milling machine, as the case may be still on the chain transporting device of this milling machine which also exits, or on a separate transporting device.

With the same goal as in the first, second and third aspect, according to a fourth independent aspect, the present invention relates to a method for manufacturing a floor board, said floor board comprising a decorative surface layer applied to a substrate, said method comprising:
 providing a substrate material comprising MDF/HDF material;
 applying a decorative surface layer to a top surface of said substrate material;
 cutting grooves into the decorative surface layer to expose the substrate material;
 impregnating the exposed substrate material with an impregnation agent;
 dividing said substrate material into planks having approximately the size of said floor board, wherein said exposed substrate material is available at the edge or close to the edge of said planks;
 profiling an edge of said planks, wherein at least a portion of the obtained edge comprises said MDF/HDF material impregnated with said impregnation agent; said MDF/HDF material being exposed at said edge.

It is clear that, in this fourth aspect, preferably an MDI based impregnation agent is used, for example the impregnation agents mentioned in connection to the first and second aspect. Preferably the solvents mentioned there are used here as well. Preferably the step or applying the surface decorative layer is performed using the so-called DPL method (Direct Pressure Laminate), wherein at least a melamine resin containing layer is hardened and adhered to the MDF/HDF material using a hot press operation. Preferably the board is still hot from this pressing operation upon impregnation. The heat tends to improve the impregnation depth.

BRIEF DESCRIPTION OF THE DRAWINGS

With the aim of further illustrating the features of the invention, here below, by way of some non-limiting examples, some preferred embodiments are illustrated with reference to the attached drawings, wherein.

DETAILED DESCRIPTION OF THE INVENTION

Figure 1:
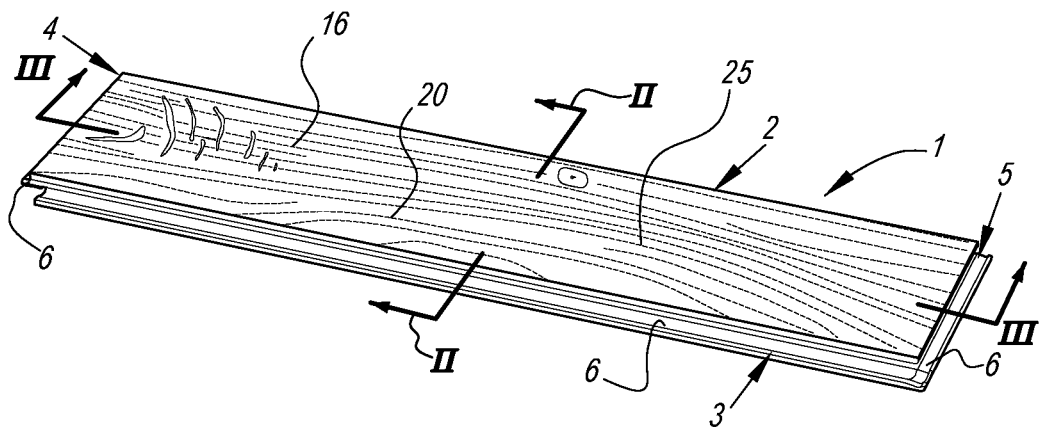
FIG. 1 gives a perspective view on a floor board in accordance with the present invention.

FIG. 1 schematically represents a floor board 1 in accordance with the present invention. In this specific case it relates to a rectangular and oblong panel 1 having a first pair of opposite edges 2-3, namely the long edges, and a second pair of opposite 7e edges 4-5, namely the short edges. Both pairs of edges 2-3, 4-5 have been provided with coupling parts 6.

Figure 2:
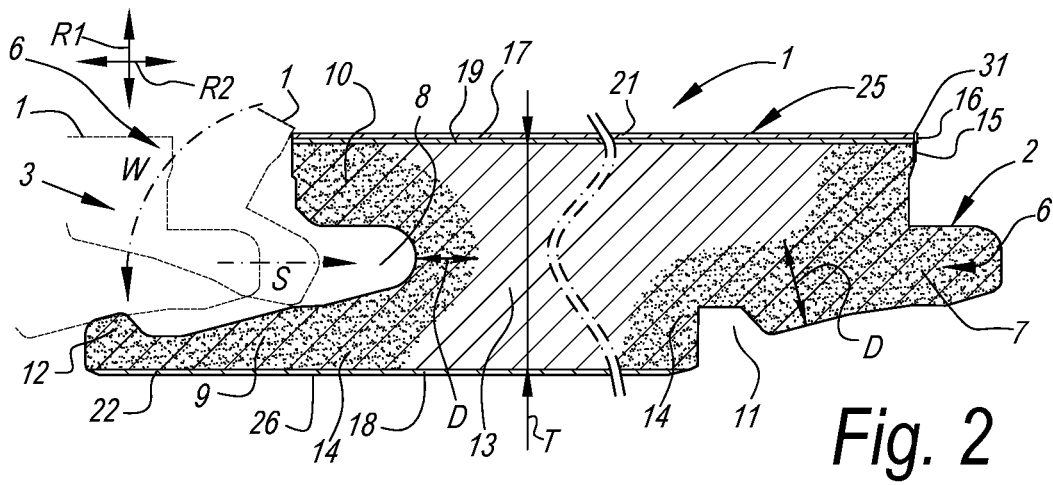
FIG. 2 at a larger scale shows a cross-section along line II-II illustrated in FIG. 1.

FIG. 2 clearly illustrates that the coupling parts 6 at the long edges 2-3 form both a first locking system, effecting a locking in the plane of the panels 1 and perpendicularly to said edges 2-3, namely a locking in the horizontal direction R2, and a second locking system, effecting a locking perpendicularly to the plane of the panels 1, namely a locking in the vertical direction R1. The coupling parts 6 illustrated here are basically formed as a tongue 7 and groove 8 connection, allowing for said locking in the vertical direction R1, wherein the tongue 7, respectively at least one of the groove lips 9-10, in this case only the lower groove lip 9, has been provided with additional locking elements 11-12, effecting said locking in said horizontal direction R2. The respective locking elements 11-12 are formed as an excavation at the lower side of the tongue 7, that cooperates with a protrusion at the upper surface of the lower groove lip 9.

The coupling parts 6 are of the type that allows that two of such panels 1 can be coupled to each other, upon choice, by a rotational movement W or a horizontal shifting S movement of one panel 1 in respect to the other. In this case the coupling parts 6 are realized entirely of the substrate 13, in this case being MDF/HDF material.

Preferably the coupling parts 6 in the coupled condition create a tension force pushing the coupled floor boards 1 towards each other at these edges 2-3. Although not illustrated here, this may be achieved by the lower groove lip 9 being slightly bent out of its normal relaxed unbent position, and due to its elasticity pushing on the tongue 7, at least at the location of the locking elements 10-11. Such tension force tends to close the joint at the upper edges, thereby creating a minimized risk for moisture ingress.

FIG. 2 further illustrates that both opposite side edges 2-3 are treated with an impregnation agent 14. The penetration depth D as measured perpendicularly to the profiled contour of the mechanical coupling parts 6 is larger than 0.8 millimeter, or larger than 2 millimeter along the entire contour, or always larger than 10 percent of the thickness T of the substrate 13.

Furthermore, FIG. 2 illustrates that a sealing agent 15 has been applied to one of the opposite side edges 2-3, in this case on the edge 2 which is provided with the tongue 7.

The panel 1 of FIG. 2 further comprises a decorative surface layer 16 comprising a print 17. A backing layer 18 or counterbalancing layer is provided at the bottom side of the substrate 13. The print 17 has been provided on a paper sheet 19, in this case, having a weight of about 60 to 80 grams per square meter, and its pattern or image represents a wood motif 20, more particularly the image of only one wooden plank. The print 17 is free from repetitions in its pattern. The decorative surface layer 16 further comprises a wear resistant layer 21 provided over the print 17. The wear resistant layer 17 of this example comprises a paper sheet, in this case impregnated with thermosetting resin and possibly hard particles, such as aluminum oxide. The backing layer 18 or counterbalancing layer also comprise a paper sheet 22 impregnated with thermosetting resin.

FIG. 2 makes clear that the sealing agent 15 has been applied immediately underneath the decorative surface layer 16, possibly overlapping therewith.

The floor board 1 of FIG. 1 may at the pair of short side edges 4-5 be provided with coupling parts 6 similar to the ones illustrated in FIG. 2 for the pair of long side edges 2-3.

Figure 3:
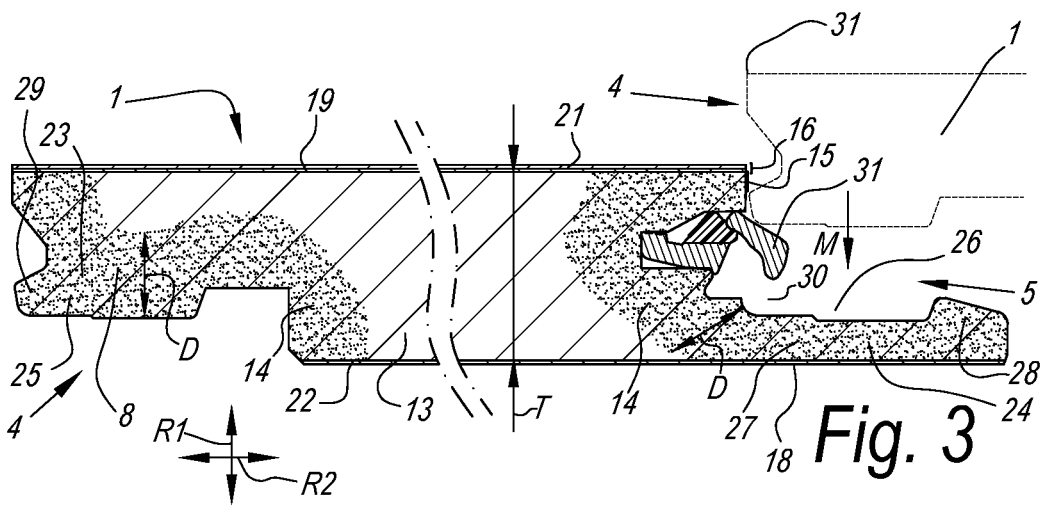
FIG. 3 at a larger scale shows a cross-section along line III-III illustrated in FIG. 1, but for a variant.

FIG. 3 illustrates a variant wherein at the pair of short side edges 4-5 the floor board is provided with coupling parts 6 allowing for a coupling by means of a downward motion M. This is particularly interesting in combination with coupling parts 6 at the pair of long side of edges that allow for coupling by means of a turning motion, such as the coupling parts illustrated in FIG. 2. The coupling parts 6 in FIG. 3 are shaped as a male part 23 at one edge 4 and a female part 24 at the opposite edge 5. The male part 23 is formed with a downwardly extending hook shaped part 25 designed to be seated in an excavation 26 provided in a lower flank 27 of the female part 24. The hook shaped part 25 and an upwardly protruding hook shaped part 28 bordering said excavation 26 cooperate to provide a locking in a direction R2 perpendicular to the coupled edges 4-5 and in the plane of the coupled floor boards 1. A locking in a direction R1 perpendicular to said plane is provided by means of a sidewardly protruding hook 29 at the male part 23 and an undercut 30 at the female part 24. In this case the undercut 30 is formed by means of a separate insert 31 that resiliently moves inwardly and subsequently outwardly to catch the hook 29 in the undercut 30 during the downward motion M.

Such coupling parts 6 allowing for a locking by means of a downward motion M are known per se, e.g., from WO 2013/102803, WO 2006/043893, WO 01/75247, WO 03/016654 and WO 2010/087752, all incorporated herein by reference.

Figure 4:
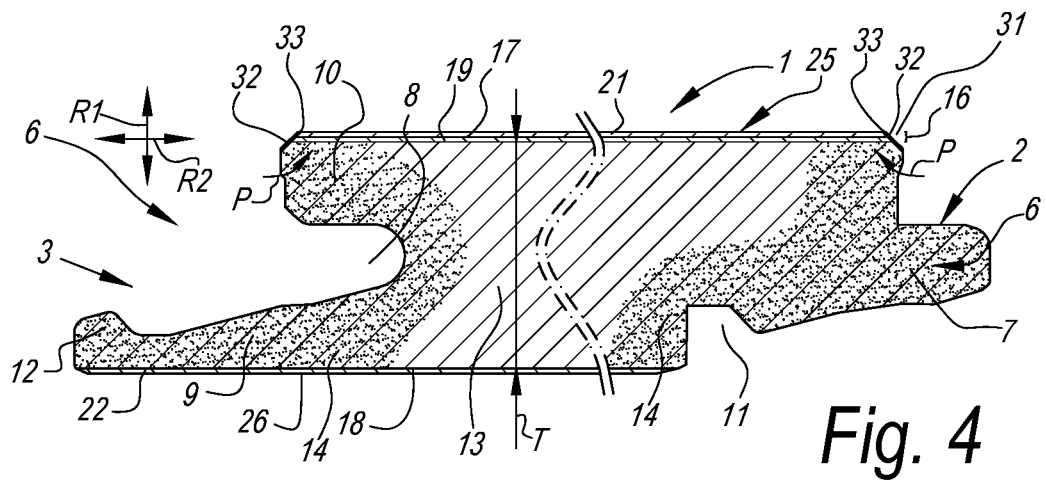
FIGS. 4 and 5 in views similar to that of FIG. 2 illustrate further variants.

According to the variant illustrated in FIG. 4, the upper edge 31 of the respective opposite edges 2-3 and/or 4-5 may be formed with a lowered edge surface 32, such as in the form of a square edge or, as illustrated here in the form of a beveled, chamfered edge. Such lowered edge surface 32 may be provided with the same decorative surface layer 16 as the remainder of the upper surface of the panel 1, or, as here be provided with a separate decoration 33, or without any decoration. Such lowered edge surface 32 may be produced by pressing the respective edge down and/or, as illustrated here, by removing a material portion from this upper edge 31, thereby exposing a part of the substrate 13 and then providing the created surface with said separate decoration 33. The first technique is e.g., described in WO 2006/066776; the second technique, the result of which is illustrated here, is described in WO 01/96688. The arrows P illustrate that the impregnation agent 14 may penetrate up from a location below the lowered edge surface 32 to the MDF/HDF material behind the lowered edge surface 32 of the substrate 13.

Figure 5:
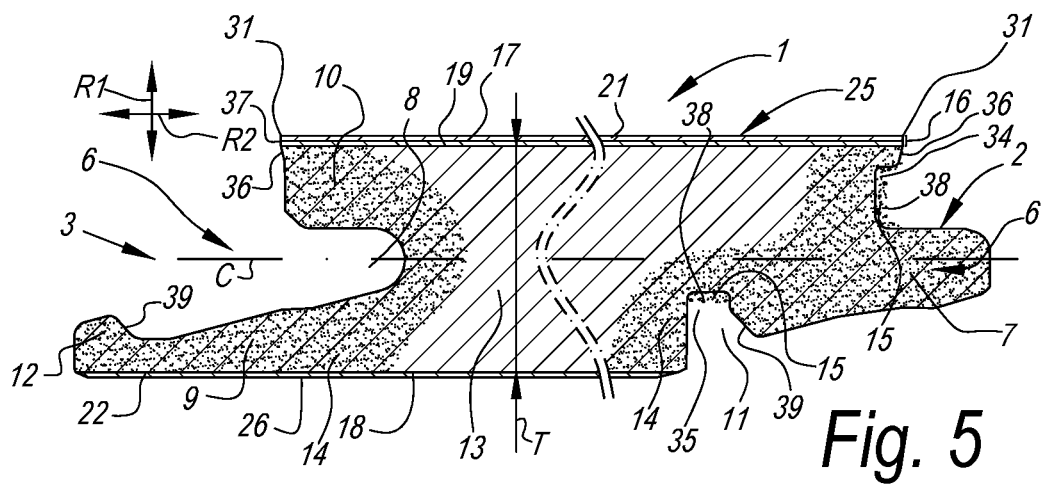

FIG. 5 shows an embodiment wherein the super absorbing material 15 is applied to the edges 2-3 at least at a location 34 above the center line C of the floor board 1, and at least at a location 35 below the center line C of the floor board 1. By the provision of the super absorbing material 15 at the location 35 below the center line C of the floor board 1 the advantage is obtained that moisture raising from the underground is prevented from further entering the joint and eventually causing damage at the upper edges 31.

In the represented case the super absorbing material 15 is in the form of particles, more particularly crystals, of SPA. The particles or crystals have an average particle size of less than 100 micron in not-swollen condition.

FIG. 5 further illustrate that the edges 2-3 may show an inclined surface 36 undercutting the respective upper edges 31, wherein this inclined surface 36 starts immediately under the decorative surface layer 16, such that in coupled condition a chamber will be formed underneath the upper edges, the chamber protruding up to or almost up to the decorative surface layer 16. Such chamber may function to accommodate the swollen crystals upon moisture ingress and will allow a sealing of the joint at a position immediately under the decorative surface layer 16. Possibly even the laterally facing side surfaces 37 of the decorative surface layer 16 adjacent to the inclined surfaces 36 may be inclined at one or both edges 2-3 in order to allow the swollen material to move up to between said laterally facing side surfaces 37.

In FIG. 5 a space 38 is created above the tongue 7 and below the decorative surface layer 16 to accommodate the super absorbing material 15 at a location above the center line C of the floor board or panel 1. Another space 38 is created above the cooperating contact surfaces 39 of the locking elements 11 and 12 to accommodate the super absorbing material at the location 35 below the center line C of the floor panel 1. It is clear that the space 38 at location 34 may be formed in the upper groove lip 10, as well, possibly in combination with the space above the tongue 7, or not.

Similar adaptations as explained in connection to FIGS. 4 and 5 may be made at the short sides 4-5, e.g., those illustrated in FIG. 3, whether or not in combination with such adaptations being available at the long sides 2-3.

The methods of the invention are of particular interest for treatment of side edges of floor boards that comprise coupling parts 6 allowing for a locking by means of a downward motion M, since, such coupling parts 6 preferably comprise a small play in the joint to allow for a smooth joining. A play of some hundredths of a millimeter, e.g., 0.05 mm, may suffice to allow a reliable, i.e., repeatable, smooth coupling. Such play, however small it may be, may lead to increased water ingress and increased exposure of the respective edges to deterioration due to this moisture. A treatment of the edges minimizing such deterioration and the subsequent effects is hence desirable. Preferably, as said above, such coupling parts are applied at the short side edges of a floorboard. At the long edges preferably coupling parts 6 are applied that at least allow for a coupling by means of a turning motion W, such as those illustrated in FIG. 2. Preferably the coupling parts 6 at the long side allow for attaining a coupled condition wherein a tension force is actively pushing the coupled floor boards 1 together and tending to close the long side joints, i.e., a coupled condition free from play. According to a not illustrated variant, at the long edges coupling parts 6 are applied that are basically shaped as a tongue and a groove wherein the tongue is provided with at least one snapping web at its upper surface, and wherein the groove is provided with a cooperating therewith undercut in the upper groove lip. Preferably in such case also at the underside of the tongue a snapping web is provided cooperating with a recess in the lower groove lip. Such tongue and groove arrangement is e.g., described in WO 02/059435 and may provide for a tight joint.

The invention may prove itself particularly useful as well in those cases where the decorative surface layer comprises or consists of a wood veneer with a thickness between 0.2 and 2 mm, e.g., from 0.3 to 0.8 mm. Such veneer layers may easily discolor due to the effects of moisture ingress into the joint. Such effects may effectively be counteracted by means of the treatments of the present invention, in particularly by using the disclosed sealing agents.

With the aim of still further illustrating the features of the invention, here below, some examples and the results obtained are listed.

Example Series 1

Twelve substances were prepared in accordance with the below table.

Each of the substances was applied to the side edges of a laminate floor panel, more particularly a DPL (Direct Pressure Laminate) floor panel with similar profiles as those illustrated in FIG. 2. The entire contour of the profiled side edges was treated. The substrate material of the floor panel consisted of an 8 mm HDF material. The glue comprised in the HDF consisted of melamine-ureumformaldehyde (MUF). The HDF further comprised about 1% of a wax emulsion. The floor panel or floor board comprised a decorative surface layer applied to the substrate material, alike the one illustrated in FIG. 2. Said decorative surface material comprised a print provided on a paper sheet, and a wear resistant layer. A backing layer or counterbalancing layer was applied to the bottom of the substrate material. The print layer, wear resistant layer and counterbalancing layer all comprised a paper layer impregnated with thermosetting resin, namely melamineformaldehyde resin.

The obtained floor panels were joined together by means of the coupling parts available at the treated side edges, and put for 24 hours (4 hours in case of samples 2' and 13') in a water bath, at a temperature of 30° C. After 24 hours the weight gain of the floor panels was recorded to define the amount of water absorbed into the HDF substrate. Further the thickness of the floor panels was recorded at the treated edges to define the swelling due to the moisture absorption. The results are given in the table as a percentage value which compares to the weight and edge thickness before the water bath. It needs to be remarked that emersion of floor panels in a bath is, of course, a test condition which does not expected to occur in real life, however this test seemed suited to illustrate the beneficial effects of the treatments of the present invention.

The table also includes the results for a reference laminate floor panel having untreated side edges.

| | Impregnation Agent | Solvent | Sealing Agent | Absorption | Edge Swelling |
|---|---|---|---|---|---|
| Ref. | None | None | None | 5.93% | 21.67% |
| 1 | 100% MDI | None | None | 1.84% | 10.1% |
| 2 | 75% MDI | 25% acetone | None | 1.17% | 6.46% |
| 2' | 75% MDI | 25% acetone | None | N.A. | 3.5% |
| 3 | 73.5% MDI | 24.5% acetone | 2% SPA | 1.23% | 7.34% |
| 4 | 71.5% MDI | 24% acetone | 4.5% SPA | 1.16% | 7.57% |
| 5 | 75% MDI | 25% ethylacetate | None | 1.08% | 5.81% |
| 6 | 75% MDI | 25% MMB-AC | None | 1.34% | 7.08% |
| 7 | 75% MDI | 25% dibasic esther | None | 1.66% | 8.9% |
| 8 | 75% MDI | 25% glycol diether | None | 1.28% | 6.65% |
| 9 | 75% MDI | 25% Rhodiasolv ® Iris | None | 1.81% | 8.98% |
| 10 | 75% MDI | 25% Prifer 6813 | None | 1.25% | 7.45% |
| 11 | 75% MDI | 25% tetramethoxyether | None | 1.15% | 5.98% |
| 12 | 75% MDI | 25% 1-Methoxy-propylacetate | None | 1.12% | 6.89% |
| 13 | 75% MDI | 25% Butyl diphenyl Methane | None | 1.12% | 5.59% |
| 13' | 75% MDI | 25% Buyl diphenyl Methane | None | N.A. | 1.5% |
| 14 | 100% fluoro-copolymer | None | None | 2.33% | 14.98% |

The results illustrate that treatment of the edges with a solvent comprising impregnation agent, especially MDI, leads to a tremendous increase of the water resistance of the laminate floor panels. Absorption is lowered from about 6% to less than 2%, and edge swelling is reduced from 21% to below 10%, especially in those cases where a solvent is used together with the impregnation agent.

Test results 2-2' and 13-13' show the positive influence of the more hydrophobic solvent Butyl diphenyl Methane on the initial performance. Edge swelling is very low in this sample after 4 hours of emersion in the water bath.

The tests are unable to demonstrate the positive influence of the sealing agent on longer standing water exposure. Since the present test conditions are concerned with soaking the coupled floor panels in a water bath, the water penetrates not only from the joint upper edges which may be sealed by the swollen crystals. At least the tests illustrate that the SPA crystals are not detrimental to the water resistance of the laminate floor panels.

Example Series 2

Ten substances were prepared in accordance with the below table.

Each of the substances was applied to the side edges of a laminate floor panel, more particularly a DPL (Direct Pressure Laminate) floor panel with similar profiles as those illustrated in FIG. 2. The entire contour of the profiled side edges was treated. The substrate material of the floor panel consisted of an 8 mm HDF material. The glue comprised in the HDF consisted of ureumformaldehyde (UF). The standard HDF further comprised about 1% of a wax emulsion, while the substrate used in tests 5 and 9 comprised only 0.3% of a wax emulsion. The substrate used in tests 3 and 6 were free from wax emulsion. The floor panel or floor board comprised a decorative surface layer applied to the substrate material, alike the one illustrated in FIG. 2. Said decorative surface material comprised a print provided on a paper sheet, and a wear resistant layer. A backing layer or counterbalancing layer was applied to the bottom of the substrate material. The print layer, wear resistant layer and counterbalancing layer all comprised a paper layer impregnated with thermosetting resin, namely melamineformaldehyde resin.

The obtained impregnation depth of the substances was measured and recorded in the below table.

|   | Impregnation Agent | Solvent | Substrate | Penetration Depth |
|---|---|---|---|---|
| 1 | None | 100% acetone | Standard MUF glued HDF board | 8 mm |
| 2 | 100% MDI | None | Standard MUF glued HDF board | 0.3 mm |
| 3 | 100% MDI | None | MUF glued HDF board, no wax content | 3 mm |
| 4 | 75% MDI | 25% acetone | Standard MUF glued HDF board | 1 mm |
| 5 | 75% MDI | 25% acetone | MUF glued HDF board, reduced wax content | 2 mm |
| 6 | 75% MDI | 25% acetone | MUF glued HDF board, no wax content | 6 mm |
| 7 | 75% MDI | 25% acetone | Standard MUF glued HDF board, prewetting with 100% acetone | 2 mm |
| 8 | 65% MDI | 35% acetone | Standard MUF glued HDF board | 2 mm |
| 9 | 65% MDI | 35% acetone | MUF glued HDF board, reduced wax content | 3 mm |
| 10 | 75% MDI | 25% Butyl Diphenyl Methane | Standard MUF glued HDF board | 4 mm |
| 11 | 100% fluoro-copolymer | None | Standard UF glued HDF board | 4 mm |

The results illustrate the positive effects of solvent use, a reduced wax content or a prewetting on the attained penetration depth.

The present invention is not limited to the preferred embodiments described here above, but such floor boards and methods may be realized according to several variants without leaving the scope of the invention. The impregnation agents and/or sealing agents disclosed in connection with the present invention, may also be used to improve the water resistance of other products based on MDF or HDF, such as floor moldings. For this reason, in accordance with a variant, the invention relates to a floor molding comprising a decorative surface layer applied to a substrate, wherein said substrate comprises MDF or HDF material, said MDF or HDF material being exposed at a surface of said floor molding, wherein said exposed material is treated with an impregnation agent and/or a sealing agent based on a super absorbing material. It is clear that the impregnation agents and/or sealing agent named in connection with the first, second and third aspect of the invention may be used in the context of this variant. Further the method of the invention, in particular the measure to improve penetration, may be used to improve the treatment of the exposed MDF/HDF surfaces of such floor molding.

The invention claimed is:

1. A method for manufacturing a floor board, said floor board comprising a decorative surface layer applied to a substrate, said method comprising:
   providing a substrate material comprising MDF or HDF material;
   applying a decorative surface layer to a top surface of said substrate material;
   dividing said substrate material into planks having approximately a size of said floor board;
   profiling a side edge of said planks; said MDF or HDF material being exposed at said side edge;
   impregnating said side edge with an impregnation agent; and
   wherein said impregnating of said side edge with the impregnation agent comprises applying the impregnation agent on said side edge while the floor board is transported on a transporting device;
   wherein said MDF or HDF material has an average density of more than 750 kg per cubic meter and comprises a higher density region at least near said decorative surface layer, wherein said higher density region has a density of 900 kilograms per cubic meter or more.

2. The method of claim 1, wherein applying the impregnation agent is done by vacuum coating.

3. The method of claim 1, wherein the transporting device is incorporated in a milling machine, which milling machine profiles said side edge.

4. The method of claim 3, wherein said transporting device is a chain transporting device incorporated in the milling machine.

5. The method of claim 3, wherein said side edge together with a side edge opposite thereto forms a first pair of opposite side edges of said substrate, wherein impregnating with said impregnation agent is done on both side edges of said first pair of opposite side edges.

6. The method of claim 5, wherein said floor board further comprises a second pair of opposite side edges, wherein impregnating with said impregnation agent is done on both sides of said second pair of opposite side edges.

7. The method of claim 1, wherein said applying of decorative surface layer includes the decorative surface layer being formed from at least one or more paper layers treated with a thermosetting resin; or at least one or more wood veneer layers.

8. The method of claim 1, wherein said impregnating with the impregnation agent is provided to at least penetrate the substrate immediately below said decorative surface layer.

9. The method of claim 1, wherein the impregnation agent comprises a fluorinated polymer.

10. The method of claim 9, wherein the fluorinated polymer is a fluorocopolymer.

11. The method of claim 3, wherein the impregnation agent comprises a solvent.

12. The method of claim 11, wherein the solvent has a flash point above 60° C. and is chosen from a list consisting of butylacetate or propylacetate, a dibasic ester, a glycol (di) ether, a benzoate ester, or a tetramethoxyether.

13. The method of claim 11, wherein the solvent is water.

14. The method of claim 11, wherein the MDF or HDF material comprises wood fibers glued by means of ureumformaldehyde or melamineureumformaldehyde.

15. The method of claim 14, wherein the MDF or HDF material comprises wax at a rate of 0.1% to 3% by weight.

16. The method of claim 15, wherein said impregnation agent is impregnated into said MDF or HDF material over an impregnation depth of at least 1 millimeter.

17. A method for manufacturing a floor board, said floor board comprising a decorative surface layer applied to a substrate, said method comprising:
   providing a substrate material comprising MDF or HDF material;
   applying a decorative surface layer to a top surface of said substrate material;
   dividing said substrate material into planks having approximately a size of said floor board;
   profiling a side edge of said planks; said MDF or HDF material being exposed at said side edge;
   impregnating said side edge with an impregnation agent; and
   wherein said impregnating of said side edge with the impregnation agent comprises vacuum coating the impregnation agent on said side edge while the floor board is transported on a transporting device;
   wherein the impregnation agent comprises a solvent, different from water;
   wherein the impregnation agent comprises a fluorinated polymer.

18. The method of claim 17, wherein the MDF or HDF material has an average density of more than 750 kg per cubic meter and comprises a higher density region at least near said decorative surface layer, wherein said higher density region has a density of 900 kilograms per cubic meter or more and wherein the MDF or HDF material comprises wax at a rate of 0.1% to 3% by weight.

19. A method for manufacturing a floor board, said floor board comprising a decorative surface layer applied to a substrate, said method comprising:
   providing a substrate material comprising MDF or HDF material;
   applying a decorative surface layer to a top surface of said substrate material;
   dividing said substrate material into planks having approximately a size of said floor board;
   profiling a side edge of said planks; said MDF or HDF material being exposed at said side edge;
   impregnating said side edge with an impregnation agent; and
   wherein said impregnating of said side edge with the impregnation agent comprises applying the impregnation agent on said side edge while the floor board is transported on a transporting device;
   wherein the impregnation agent comprises a fluorinated polymer.

20. The method of claim 19, wherein the transporting device is incorporated in a milling machine, which milling machine profiles said side edge.

21. The method of claim 20, wherein said transporting device is a chain transporting device incorporated in the milling machine.

22. The method of claim 20, wherein applying the impregnation agent is done by vacuum coating.

23. The method of claim 22, wherein the impregnation agent comprises a solvent having a flash point above 60° C.

24. The method of claim 23, wherein the solvent is chosen from a list consisting of butylacetate or propylacetate, a dibasic ester, a glycol (di) ether, a benzoate ester, or a tetramethoxyether.

25. A method for manufacturing a floor board, said floor board comprising a decorative surface layer applied to a substrate, said method comprising:
   providing a substrate material comprising MDF or HDF material;
   applying a decorative surface layer to a top surface of said substrate material;
   dividing said substrate material into planks having approximately a size of said floor board;
   profiling a side edge of said planks; said MDF or HDF material being exposed at said side edge;
   impregnating said side edge with an impregnation agent;
   wherein said impregnating of said side edge with the impregnation agent comprises applying the impregnation agent on said side edge while the floor board is transported on a transporting device;
   wherein said MDF or HDF material has an average density of more than 750 kg per cubic meter and comprises a higher density region at least near said decorative surface layer, wherein said higher density region has a density of 900 kilograms per cubic meter or more;
   wherein applying the impregnation agent is done by vacuum coating.

26. The method of claim 25, wherein the transporting device is incorporated in a milling machine, which milling machine profiles said side edge.

27. The method of claim 26, wherein said applying of decorative surface layer includes the decorative surface layer being formed from at least one or more paper layers treated with a thermosetting resin; or at least one or more wood veneer layers.

28. The method of claim 27, wherein the impregnation agent comprises a solvent having a flash point above 60° C.

29. The method of claim 28, wherein the MDF or HDF material comprises wood fibers glued by means of ureumformaldehyde or melamineureumformaldehyde and comprises wax at a rate of 0.1% to 3% by weight.

30. The method of claim 29, wherein the impregnation agent comprises a fluorinated polymer.

* * * * *